UNITED STATES PATENT OFFICE.

TILLMAN S. PAYNE, OF CLEVELAND, TENNESSEE.

COATING AND POLISHING COMPOSITION.

1,295,584. Specification of Letters Patent. Patented Feb. 25, 1919.

No Drawing. Application filed May 24, 1916, Serial No. 99,680. Renewed July 24, 1918. Serial No. 246,609.

*To all whom it may concern:*

Be it known that I, TILLMAN S. PAYNE, a citizen of the United States, residing at Cleveland, in the county of Bradley and State of Tennessee, have invented a new and useful Coating and Polishing Composition, of which the following is a specification.

The object of my invention is the production of a composition to be applied to the varnished surfaces of floors, furniture, automobile bodies and fixtures, and especially to leather surfaces of every kind.

My said composition consists of a mixture or solution of raw linseed oil, vinegar, spirits of turpentine, alcohol and black antimony, prepared and united by stirring while being heated to a temperature of about 80 degrees Fahrenheit.

In preparing the composition I prefer to use the ingredients in about the following proportions: equal parts of raw linseed oil and vinegar, to any quantity of which, when mixed, is added two per cent. (2%) of spirits of turpentine, five per cent. (5%) of alcohol, and three per cent. (3%) of black antimony.

I do not intend to claim every compound or composition which these ingredients are capable of making when used in different proportions; nor do I intend to limit my claim to the exact proportions here given, as they may be slightly varied without changing the result, though it is better to adhere to the proportions above specified.

I claim as my invention:—

A composition consisting of raw linseed oil, vinegar, spirits of turpentine, alcohol and black antimony, proportioned to each other substantially as described, to form a solution for applying to varnished surfaces and surfaces of leather as a polish, or for other similar purposes.

TILLMAN S. PAYNE.

Witnesses:
 C. H. TARPLEY,
 W. C. DILBUCK.